Nov. 3, 1931.  W. H. SMITH ET AL  1,830,570
PNEUMATIC UPHOLSTERY
Filed Aug. 18, 1930   2 Sheets-Sheet 1

Nov. 3, 1931.   W. H. SMITH ET AL   1,830,570
PNEUMATIC UPHOLSTERY
Filed Aug. 18, 1930   2 Sheets-Sheet 2

Inventors:—
William H. Smith.
Henry E. Staley
By their Attorney: Walter Gunn.

Patented Nov. 3, 1931

1,830,570

UNITED STATES PATENT OFFICE

WILLIAM HENRY SMITH, OF WITHINGTON, AND HENRY CONNAH STANLEY, OF ERDINGTON, ENGLAND

PNEUMATIC UPHOLSTERY

Application filed August 18, 1930, Serial No. 476,088, and in Great Britain September 9, 1929.

This invention refers to pneumatic upholstery, and in particular to pneumatic seats and seat backs requiring normally to maintain their shape and to resist lateral displacement or rolling when sat or leaned upon.

The main object of this invention is to provide means whereby the resistance to lateral displacement or rolling is more effectively controlled, or determined. A further object is to provide a combined seat and seat back, having the aforesaid improvements and adapted to be handled and used as a single unit and to be used as a double or twin seat (or double back) when so desired.

According to the invention, the improved pneumatic upholstery comprises in one form a rubber bag, and tubular tie-pieces or eyelets made of rubber, connecting the upper and lower walls of the bag together. Further, the tubular tie-pieces are of flat or elongated shape in transverse cross section, that is to say, the tie-pieces are comparatively narrow in one direction and comparatively long in a direction at right angles to the narrower dimension. By thus forming the tie-pieces, they are practically inextensible in one direction, i. e., in the direction of their major axes, and serve to give greatly increased resistance to rolling of the rubber bag in the direction of the said major axes. The said tie-pieces, of flat or elongated cross section, are arranged in the rubber bag in positions where their longer or major axes will afford resistance to rolling in the desired directions. In most cases, certain of the tie-pieces will be arranged with their major axes at right angles to the major axes of the other tie-pieces.

The tie-pieces will preferably be of short axial length, so that they will not be distorted (bent or deflected) when the bag is sat or leaned upon.

Two rubber bags, each constructed as before described, may be combined to form a single upholstery unit, and serve as a seat and back rest, or as a double seat, the bags being connected by a rubber jointing piece, and being supplied with a single inflating valve and air inlet conduit between the bags, or a separate valve being provided for each bag.

Sponge rubber may be employed for filling the openings in the tie-pieces.

The rubber bag or bags may be covered with a leather or other covering, or may be moulded in shape and surface in imitation of leather or other ordinary upholstery.

Upon the accompanying drawings:—

Figure 1:
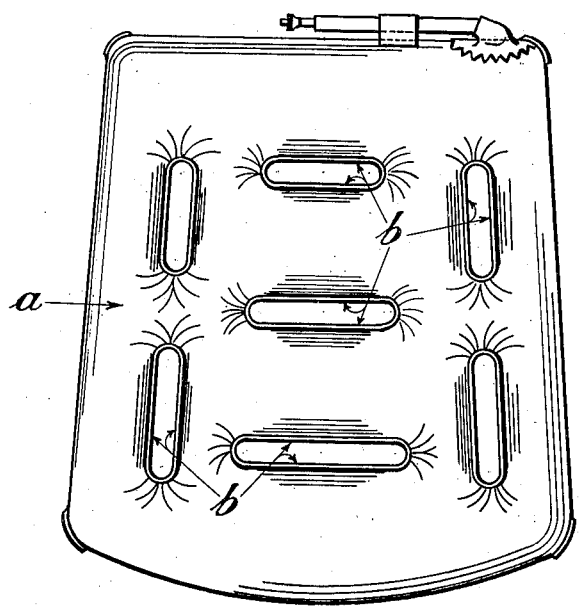
Figure 2:
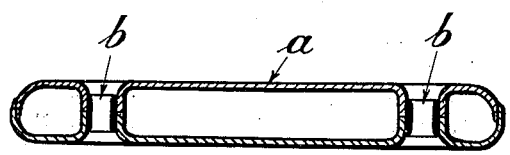
Figure 3:
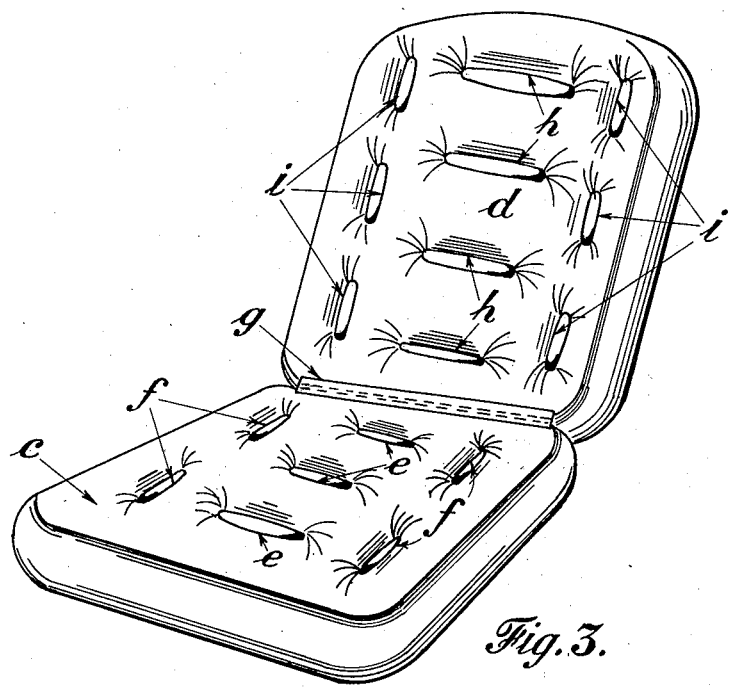
Figures 4, 5:
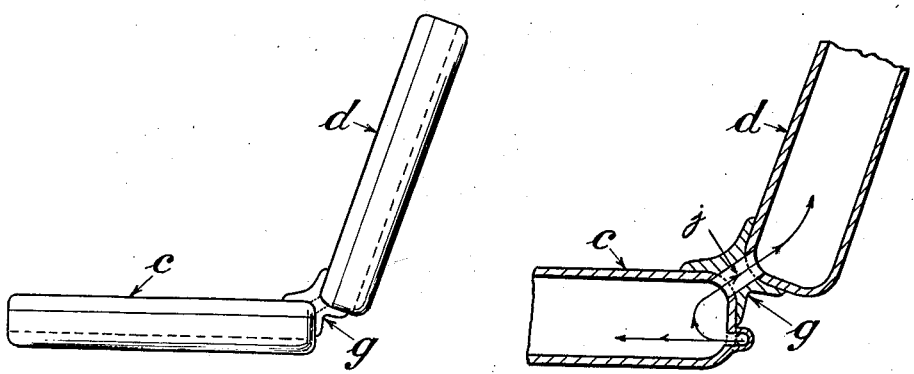

Fig. 1 is a plan, and
Fig. 2 is a cross section of a single rubber cushion with the invention applied thereto.
Fig. 3 is a perspective view of a combined seat and back cushion for a motor car made in accordance with the invention.
Fig. 4 is a geometric side view of Fig. 3.
Fig. 5 is an enlarged cross section of parts of Fig. 4.

In Fig. 1, $a$ is the rubber bag, and $b$, $b$, the tie-pieces. As shown more clearly in Fig. 2, each tie-piece comprises an eyelet or tube of rubber, secured (vulcanized) to the top and bottom parts of the bag, the tube being comparatively short.

In transverse cross section, each eyelet or tube is flat sided or elongated. In the example shown, the major axis is about 6 times longer than the minor axis, say 3" by ½". In thus making the eyelets, they are practically inextensible in the direction of their major axes, and therefore, with such major axes set parallel with the direction of rolling, they more effectively resist any lateral disturbance of the top face of the bag in the direction of rolling, than a round circular eyelet.

In Fig. 3, $c$ is the seat and $d$ the back rest. Centrally of the seat $c$ are three tie-pieces $e$ each with an elongated opening and the openings arranged with their major axes parallel to one another and to the front and rear edges of the seat. The centre and forward tie-pieces are progressively longer than the back tie-piece. At each side are two further tie-pieces $f$, each with an elongated opening, and the opening lying parallel with the side edges of the seat, the rear ends of the back tie-pieces being in line with the back transverse tie-piece and the forward tie-pieces extending in front of the forward transverse tie-pieces. The back rest portion *d* of the cushion, is a separate bag, but positively connected to the seat portion *c* by a hinge piece of rubber *g*. The top edge of the back rest is curved to conform to the usual type of bucket seat for a car and has four transverse tie-pieces *h* with elongated openings of progressively increasing size, the largest opening being at the top, and three tie-pieces *i* at each side. Separate valves, not shown, may be provided for the seat and back, or a single valve common to both may be provided, an air conduit *j* (Fig. 5) being arranged between the seat and back rest.

The back rest may be folded down on to the seat, and act as a double seat, or the seat and back rest may be arranged side by side, and serve as two seats.

The rubber bag or bags may be ornamented or treated to resemble leather, or the bag or bags may be covered with leather or the like.

By filling the eyelets with sponge rubber, they are rendered still further non-distortable, when the bag is subject to load.

The relative positions of the eyelets and their spacings allow of the bag having the appearance of the ordinary buttoning.

What we claim is:—

1. In pneumatic upholstery, a rubber bag having the pieces connecting the upper and lower walls of the bag and of a section providing elongated apertures in the faces of the bag, the tie pieces being arranged with the major axis of their apertures in more than one direction so that individually they each permit freer movement across their said major axis, but collectively they resist relative movement between the upper and lower walls of the bag in all directions in the plane of the bag.

2. In pneumatic upholstery, a rubber bag, according to claim 1, characterized by an arrangement of the tie pieces with the aperture of each tie piece with its major axis parallel to that of some and at right angles to that of other adjacent tie pieces so that the upper and lower walls of the bag are tied together essentially against relative movement in two directions at right angles to each other.

3. In pneumatic upholstery, a rubber bag, according to claim 1, characterized by the arrangement of those tie pieces immediately adjacent to the sides of the bag with their major axis parallel therewith.

In testimony whereof they have signed their names to this specification.

WILLIAM HENRY SMITH.
HENRY CONNAH STANLEY.